Feb. 25, 1969 — J. F. JACONO — 3,429,394

VEHICULAR VARIABLE SPEED DRIVE SYSTEM

Filed March 9, 1966

INVENTOR.
JAMES F. JACONO
BY
Walter B. Udell
ATTORNEY.

Feb. 25, 1969  J. F. JACONO  3,429,394
VEHICULAR VARIABLE SPEED DRIVE SYSTEM
Filed March 9, 1966  Sheet 2 of 2

INVENTOR.
JAMES F. JACONO
BY
Walter B. Udell
ATTORNEY

United States Patent Office 3,429,394
Patented Feb. 25, 1969

3,429,394
VEHICULAR VARIABLE SPEED DRIVE SYSTEM
James F. Jacono, 4168 Oliver Lane,
Boothwyn, Pa. 19061
Filed Mar. 9, 1966, Ser. No. 533,083
U.S. Cl. 180—70     12 Claims
Int. Cl. B60k 17/06, 23/04; F16h 57/10

ABSTRACT OF THE DISCLOSURE

An automotive power drive device utilizing a differential gear train to achieve variable speed at one output shaft from a given input shaft speed through control of the rotational speed of the second output shaft by suitable means such as a shaft brake. In one form, the second output shaft is reduced in speed to a complete stop from the same speed as the first output shaft to thereby double the speed of the latter. In another form, the second output shaft is controllably reduced as desired from its free-running unloaded speed to a limiting locked condition to provide a continuous speed increase at the first output shaft in inverse proportion to the speed decrease of the second shaft, this form also including a servo loop to prevent stalling of the input shaft drive system under load.

---

This invention relates generally to vehicular drive systems, and more particularly relates to devices operative to change the gearing ratio in a drive train without mechanically disengaging and engaging the gears in the system. This is accomplished through the use of a differential gear train. In one application, the invention provides an automatic transmission system of continuously variable gearing ratio between zero and a predetermined maximum value. In another aspect, the invention provides a substantially instantaneous change in gearing ratio of two to one which may be utilized in conjunction with or independently of the previously mentioned automatic transmission system.

The quick gearing ratio change feature of the invention has application where it is desirable to effect very rapid acceleration, as for example in some emergency situations encountered in driving the usual automobile, or in the field of short distance racing such as on the quarter mile drag strips. In the automatic transmission aspect of the invention, the absence of any gear shifting whatever, whether manual or automatic, provides the smoothest possible type of pick-up since there are no drive system discontinuities. In this regard it is similar to a non-geared fluid coupling system but is not subject to the pick-up lag characteristic of these devices or the mechanical or hydraulic complexity of the variable pitch vaned fluid coupling drive systems. Accordingly, it is a primary object of my invention to provide a novel vehicular drive system including means for effecting a two-to-one step-up in the drive system gearing ratio substantially instantaneously and without mechanical gear shifting to thereby provide very rapid acceleration of the drive system output shaft.

Another object of my invention is to provide a novel drive system as aforesaid which utilizes a differential gear train having an input drive shaft and a pair of driven output shafts, one of the driven output shafts being provided with means for slowing its rotation or bringing it to a stop if desired to thereby cause the other driven output shaft to accelerate under conditions of constant rotational velocity of the input drive shaft.

A further object of my invention is to provide a novel drive system as aforesaid which functions as an automatic transmission by automatically increasing the power to one of the driven output shafts by changing the effective gearing ratio between the driven output shaft and the input drive shaft as the rotational velocity of the input drive shaft is increased.

The foregoing and other objects of my invention will appear more fully hereinafter from a reading of the following specification in conjunction with an examination of the appended drawings, wherein.

In the several figures, like elements are denoted by like reference characters.

Figure 1:
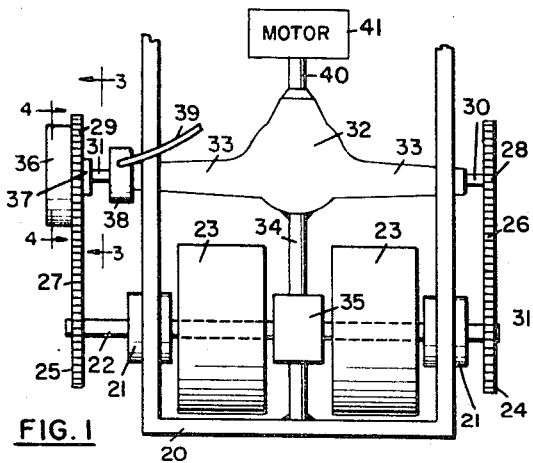
FIGURE 1 illustrates in plan view the novel drive system according to the invention incorporated into the drive system of an automotive vehicle.

Turning now to the drawings, consider first FIGURE 1 which illustrates the rear end of an automotive vehicle into which the vehicular drive system according to the invention has been incorporated. The side rails of the chassis frame 20 have fixedly secured thereto near the rear cross member a pair of bearings 21 through which passes the rear axle 22 upon which the rear wheels 23 are mounted within the perimeter of the chassis frame 20, the outer ends of the rear axle 22 having fixed thereto for rotation therewith a pair of drive gears 24 and 25 about which are trained respectively drive chains 26 and 27. Drive chain 26 extends forward with respect to the chassis frame 20 along the outside thereof and is trained about a front drive gear 28, while drive chain 27 on the opposite side of the frame is similarly trained about the front drive gear 29.

Drive gear 28 is fixed upon for rotation with the driven output shaft 30 of a conventional type of automotive rear end designated generally as 32, while the drive gear 29 is coupled to driven output shaft 31 of the rear end 32 through a drive coupling to be described. The output shafts 30 and 31, which would be the rear axle in a conventional automotive drive system, extend inward through the axle housing arms 33 of the rear end 32 and are coupled into the differential gear train in the manner shown in FIGURE 2 to be subsequently described. The axle housing arms 33 of the rear end 32 are fixedly secured to the side rails of the chassis frame 20 in the conventional manner. A reinforcing support strut 34 is fixedly secured to and extends between the rear rail of the chassis frame 20 and the back end of the automotive rear end 32, and a brake system 35 of any desired type carried by the reinforcing strut 34 is operative to act upon the rear axle 22 or rear wheels 23 when it is desired to stop the vehicle.

The front drive gear 29 is coupled to the driven output shaft 31 through a drive coupling system contained within the housing 36 secured to the outer face of drive gear 29, the drive gear 29 carrying on its inner face a bearing 37 by means of which the gear is journalled upon the shaft 31 with the latter passing completely through the gear 29 and into the drive coupling system housing 36. A brake system 38 is operatively mounted with respect to the driven output shaft 31 so that when the brake is actuated through its actuating line 39 the output shaf 31 may be brought to a stop substantially instantaneously. The brake system 38 may take any desired form and may be electrically, hydraulically or mechanically actuated.

Figure 2:
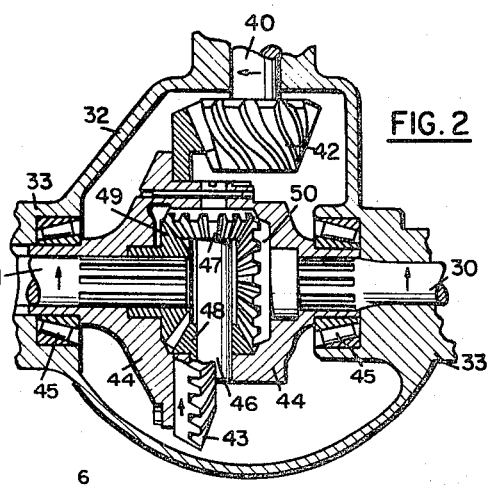
FIGURE 2 is a plan view of the interior of a conventional automotive rear end differential gear system with some of the gears being shown in elevation while others are shown in section.
Figure 3:
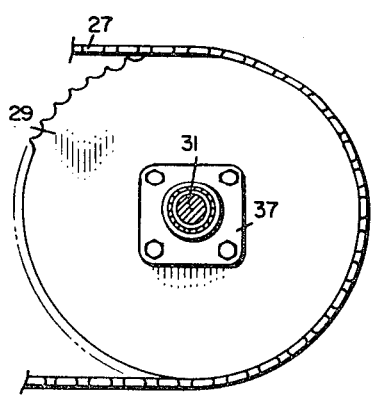
FIGURE 3 is an enlarged elevational view of a front drive gear coupled to one of the driven output shafts of the rear end as would be seen when viewed along the line 3—3 of FIGURE 1.
Figure 7:
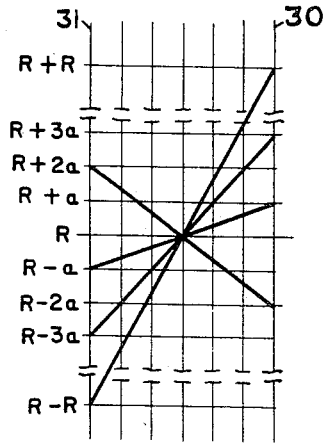
FIGURE 7 is a diagram illustrating the change in rotational velocity of one of the driven output shafts of a differential in accordance with the change in rotational velocity of the other due to the loading imposed upon the other driven shaft.

It is the drive coupling system within the housing 36 combined with the brake system 38 which effects the two-to-one gearing step-up through the differential gear train contained in the rear end 32, and in order to best understand the changes in the drive system which occur, reference should be now made also to FIGURES 2 and 7 which disclose details of the differential gear train and the relationships between the driven output shafts 30 and 31 as a function of shaft loading when driven by the input drive shaft 40 from motor 41.

As seen in FIGURE 2, the input drive shaft 40 from the motor 41 terminates inside the casing of the rear end 32 in a pinion gear 42 having its teeth in mesh with the large ring or bevel gear 43 which latter is fixedly secured to a revoluble box or housing 44 journalled for rotation in bearings 45 carried by the inner ends of the axle housing arms 33. Extending through the hollow revoluble box 44 diametrically of the ring gear 43 is a pin 46 upon which are disposed for rotation thereabout the usual pinion gears 47 and 48, with a pair of side gears 49 and 50 journalled in the box 44 completing the differential gear arrangement. The driven output shafts 30 and 31 extend inward coaxially through the revoluble box bearings 45 and into splined engagement respectively with the side gears 50 and 49.

Assuming that input drive shaft 40 is driven in the direction indicated by the rotational arrow shown thereon, ring gear 43 rotates in the sense indicated by the arrow shown on it and carries with it the revoluble box 44 and pin 46. Assuming further that the loads are equal on the driven output shafts 30 and 31, then pinion gears 47 and 48 do not rotate on the pin 46 and the side gears 49 and 50 are rotated at the same rate and in the direction shown by the rotational direction arrows on the shafts 30 and 31. In the chart of FIGURE 7 this represents the condition illustrated by the horizontal line designated as reference velocity R which extends from the vertical line 31 to the vertical line 30, these vertical lines representing the rotational velocity of the respective driven output shafts 30 and 31.

From FIGURE 7 it is observed that with shafts 30 and 31 initially turning at reference velocity due to a constant velocity rotation of the input drive shaft 40 transmitted to the output shafts through the differential gear train, a reduction in speed of shaft 31 from R to (R—a) results in an increase in the rotational speed of shaft 30 to the value (R+a). In other words, an incremental decrease in the shaft speed of one of the driven output shafts results in an incremental increase in the speed of the other driven output shaft such that the increments are exactly alike. FIGURE 7 illustrates this relationship for reductions in rotational speed of shaft 31 by increments —a, —3a and —R to produce corresponding increases in speed of shaft 30 of +a, +3a and +R.

When sufficient drag is applied to one of the shafts, as for example shaft 31, to bring the shaft speed to a complete stop as shown in FIGURE 7 for shaft 31, it is observed that the rotational speed of shaft 30 is increased to twice the original reference speed or 2R. Consequently, it will be appreciated that by clamping one of the driven output shafts of a differential gear train, the effective gearing ratio through the differential from the input shaft to the non-clamped output shaft is precisely doubled. Moreover, by variably loading one of the output shafts of the differential gear train it is possible to obtain a continuous spectrum of gearing ratios between the input driving shaft and the output shaft not subject to the variable loading condition, the range of gearing ratios being variable from zero to twice the gearing ratio which exists at a synchronous speed of the output shafts. It is this continuous variability in gearing ratio which makes possible the automatic transmission system according to the invention which will be subsequently described.

The effect of locking one of the driven output shafts of the differential gear train is readily understood by referring to FIGURE 2 and considering first a case where the input drive shaft 40 is not rotating, and hence the bevel gear 43 and revolving box 44 are stationary. Under this condition, when output shaft 31 is externally driven, it causes the pinion gears 47 and 48 to counterrotate relative to one another about the pin 46 and to thereby drive shaft 30 through side gear 50 at the same rotational rate as shaft 31 is being driven but in the opposite sense. From this it should be clear that the rate of relative rotation between the output shafts 30 and 31 is twice the rotational rate of either since these shafts are moving in opposite sense.

If now the ring gear 43 were caused to rotate by pinion 42 at the same rate of rotation as for example shaft 31 but in the opposite sense thereto, the effective rotational rate of shaft 31 would become zero while the effective rotational rate of shaft 30 would exactly double since it has added to it a rotational component in the same direction equal to that at which it was previously rotated. This net result is precisely what occurs when shaft 31 is clamped externally to prevent it from rotating and the differential gear system is driven from the input drive shaft 40. One rotational component is produced on output shaft 30 by the action of the ring gear 43 causing rotation of the revoluble box 44 to thereby rotate the shaft 30, while the second and equal component is added to shaft 30 by counterrotation of the pinion gears 47 and 48 about pin 46 due to the fixed position of side gear 49.

From the foregoing, it should also be now evident that drag applied to output shaft 31 in an amount less than that necessary to stop the shaft will cause the pinion gears 47 and 48 to rotate about pin 46 at a rate less than maximum so that the component added to the rotational rate of output shaft 30 will be correspondingly less than maximum.

Understanding now how a two to one gearing step up of the rotational speed of differential output shaft 30 can be achieved by stopping rotation of output shaft 31, reference back to FIGURE 1 discloses that this is precisely the result of actuation of brake system 38. Of course, the stopping of output shaft 31 by means of the brake 38 requires that this output shaft also become decoupled from the driving system by means of which it is coupled to the left hand rear wheel 23 through drive gears 25 and 29 and drive chain 27. This decoupling action is carried out by the coupling system contained within the housing 36 mounted on front drive gear 29, together with the bearing 37 also carried by the front drive gear 29.

Referring now to FIGURES 3 through 6, it is observed that the driven output shaft 31 which passes revolubly through the bearing 37 and front drive gear 29 has rigidly secured to its outer end a plate 51 made for example from heavy steel, the plate 51 being oriented with its plane perpendicular to the axis of output shaft 31 and carrying fixed pivot pins 52 extending parallel to and spaced equally outward from output shaft 39. The pivot plate 51 is positioned outwardly away from the outer face of front drive gear 29 with the pivot pins 52 extending toward the gear face from the inner face of the pivot plate. Swingably mounted on each of the pivots 52 is a swing arm 53 with the pivots 52 located longitudinally off center with respect to the arm length to thereby form a short and a long arm segment extending respectively in opposite longitudinal directions from the pivot 52 transversely to the axis of output shaft 31 and substantially parallel to the plane of the drive gear 29.

Figure 5:
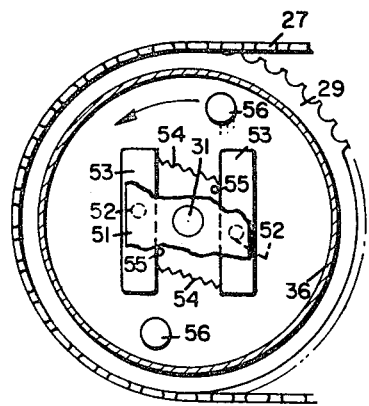
FIGURE 5 is the structure of FIGURE 4 under conditions where decoupling of the drive system has been effected.
Figure 6:
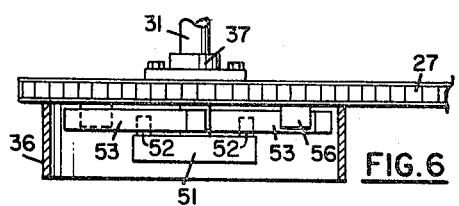
FIGURE 6 is a plan view as would be seen when viewed along the line 6—6 of FIGURE 4.

As best seen in FIGURE 5, the longer segment of each swing arm 53 is coupled to the short segment of the upper swing arm by a spring member 54 extending therebetween and urging the arm ends inward toward one another until the longer segments abut the stop pins 55. Rigidly affixed to and extending outward from the outer face of the drive gear 29 are a pair of studs 56 disposed equal distances radially outwardly from the output shaft 31 and both on a straight line therewith, the radial displacement of the studs from the output shaft 31 being sufficient to permit the studs 56 to rotate on a circle about output shaft 31 without contacting the swing arms 53 when the latter are drawn inward against the stop pins 55 as shown in FIGURE 5.

Figure 4:
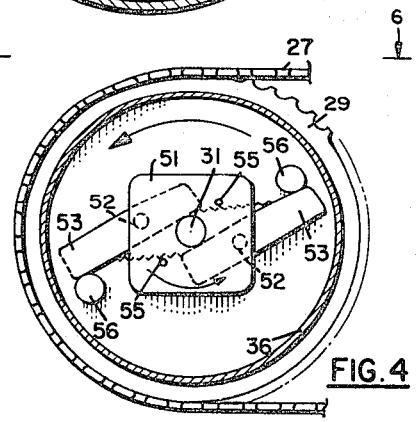
FIGURE 4 is a vertical sectional view through the casework enclosing the coupling system which intercouples the output shaft of the rear end with the chain drive system for the vehicle drive wheels as would be seen when viewed along the line 4—4 of FIGURE 1.

As shown in FIGURE 4, however, the swing arms 53 may be swung outward about pivots 52 and against the bias of springs 54 so that the ends of the longer segments of the swing arm may be rotated into engagement with the studs 56. As shown in FIGURE 4, it is clear that rotation of output shaft 31 in a counterclockwise sense carries the pivot plate 51 and the swing arms 53 therewith and drives front drive gear 29 also in a counterclockwise direction through the driving engagement of the swing arms with the studs 56. The drive gear 29 is therefore coupled to and driven by the output shaft 31. If now the output shaft 31 were suddenly stopped while drive gear 29 continued to rotate, the studs 56 would rotate out of engagement with the swing arms 53 and the latter would be pulled inward by springs 54 resulting in the conditions shown in FIGURE 5. Under these conditions, the drive gear 29 is decoupled from the driven output shaft 31 and may rotate relatively thereto on the bearing 37.

Returning now to the showing of FIGURE 1, and assuming that the output shaft 31 is coupled to the front drive gear 29 by virtue of the coupling conditions existing as shown in FIGURE 4, the novel drive system according to the invention functions in the following manner. With the brake 38 released and the rear wheels 23 resting on the ground, motor 41 through a suitable clutch system turns input drive shaft 40 and its pinion gear 42 to rotate the ring gear 43 and revoluble housing 44 to thereby rotate the output drive shafts 30 and 31 at equal speed. The rotational motion of the driven output shafts 30 and 31 is transmitted respectively to front drive gears 28 and 29 and thence through drive chains 26 and 27 to rear drive gears 24 and 25 which simultaneously synchronously drive the rear axle 22 upon which are mounted the rear wheels 23.

When now it is desired to suddenly step up the drive gearing ratio, the brake system 38 is actuated to lock the driven output shaft 31 against further rotation and thereby shift the component of driving power from output shaft 31 into output shaft 30 through the differential pinion gears 47 and 48 in the manner previously described. The stepped up power is transmitted to the rear drive wheels through the driving gears 24 and 28 and connecting drive chain 26. Since rear drive gear 25 is locked to the rear axle 22, the stepped up rotation is also transmitted to drive chain 27 and front drive gear 29. The locking of output drive shaft 31 by the brake system 38 permits the studs 56 of the drive gear 29 to rotate out of engagement with the swing arms 53 in the manner previously described to thereby decouple drive gear 29 from axle 31 and permit free rotation of the drive gear on the bearing 37. All of the driving power is now transmitted from the motor to the rear wheels through the right hand driving system including the drive gears 24 and 28 and drive chain 26, the left hand drive system which includes the drive gears 25 and 29 with driving chain 27 becoming merely an idling system.

Figure 8:
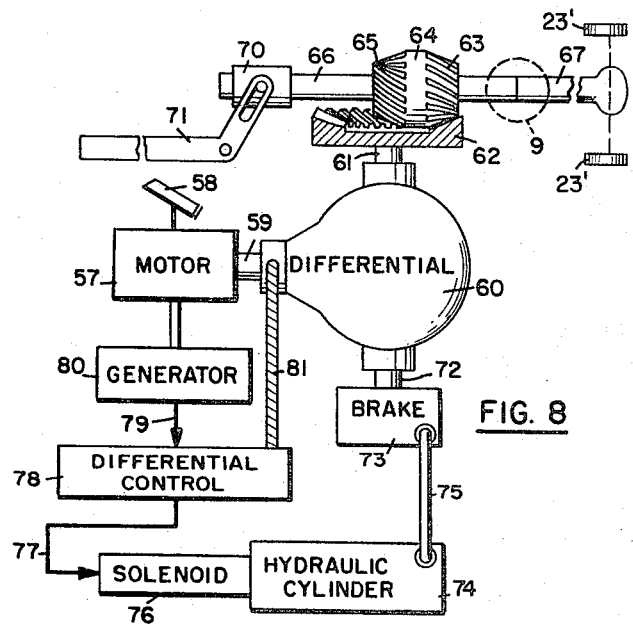
FIGURE 8 illustrates a novel transmission system utilizing the invention.

Understanding now the manner of effecting variable gearing through a differential gear train system, attention should be now directed to the showing of FIGURE 8 which illustrates the incorporation of such a device into a vehicular drive automatic transmission system. A motor 57 whose speed is controlled by an accelerator 58, which may be the conventional foot pedal, rotates the input shaft 59 of differential 60. One of the differential output shafts 61 has fixed thereupon for rotation therewith a bevel gear 62 the teeth of which are engaged with one set of gear teeth 63 of a double pinion gear 64, the double pinion having a second set of gear teeth 65 axially spaced from the gear teeth 63 and which as shown are not engaged. The double pinion gear 64 is fixed upon and drives one part 66 of a two part drive shaft which also includes an axially aligned drive shaft section 67.

Figure 9:
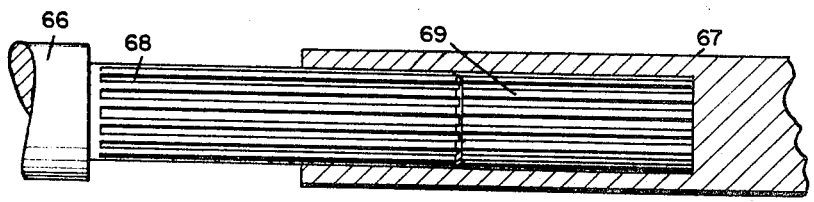
FIGURE 9 is an enlarged and partially sectioned view of the splined shaft coupling indicated at the phantom circle designated as 9 in FIGURE 8.

As seen in FIGURE 9, the drive shaft parts 66 and 67 are telescopically engaged and provided with interfitting splined formations 68 and 69 so that rotation of the drive shaft part 66 also causes rotation of the drive shaft part 67 through the splined coupling regardless of the axially shifted position of one with respect to the other within the engagement range of the shaft parts. Fitted upon the drive shaft part 66 is a sleeve bearing 70 the inner part of which rotates with the shaft part 66 within the outer part of the bearing, the latter being coupled to a pivoted lever 71 by means of which the double pinion gear 64 may be axially shifted to disengage its teeth 63 from the bevel gear 62 and bring its teeth 65 into engagement with the bevel gear to thereby effect reversal of rotation of the drive shaft 66 and drive shaft part 67 splined thereto. This arrangement allows for reverse motion of the vehicle driven by the illustrated drive system.

The other output shaft 72 of differential 60 is operatively coupled to the brake system 73 which when actuated from hydraulic cylinder 74 via connecting line 75 applies rotational drag to the output shaft 72 to slow or stop the shaft as desired and in accordance with the automatic control system which is governed by the differential input shaft 59, and hence by the speed of the motor 57. The brake system 73 could be a drum or disc or other system, and may be operated hydraulically as shown or electrically by solenoid action without an intervening hydraulic system. It is well understood that automotive brake systems have a continuous range of braking engagement and are not restricted to being either completely disengaged or completely engaged, but may be applied continuously between these limiting conditions.

Figure 10:
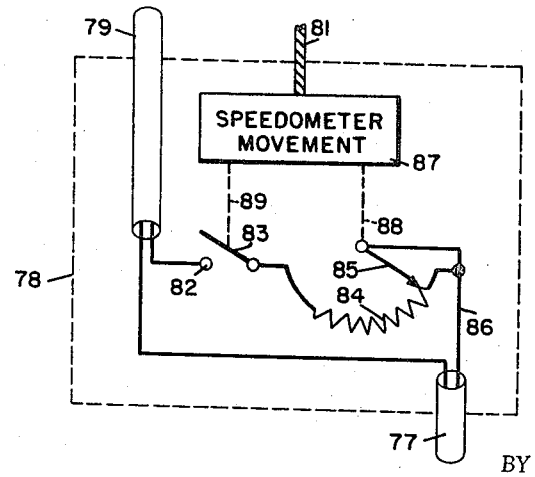
FIGURE 10 illustrates one possible differential control system illustrated as the functional differential control box in the showing of FIGURE 8.

The solenoid 76 operates the hydraulic cylinder through a continuous range to provide variable operation of the brake system 73, the stroke of the solenoid plunger being determined by the magnitude of the solenoid energizing current delivered over cable 77 through the differential control 78 and cable 79 from electrical generator 80. The generator 80 is driven by the motor 57, and the electrical output of the generator is controlled in the differential control 78 by a speedometer cable 81 in accordance with the rotational velocity of the differential input shaft 59 which the speedometer cable monitors. The monitoring system of the differential control 78 may take the configuration shown in FIGURE 10, to which reference should now be made.

The cable 79 contains a pair of conductors one of which continues uninterrupted into the cable 77 while the other connects to the contact 82 of a normally open centrifugal switch having a pole 83. The switch pole 83 connects to one end of the resistance element of a rheostat 84 in which the other end of the resistance element is electrically connected to the rheostat movable contact 85 and also to the second conductor 86 of outgoing electrical cable 77. The speedometer cable 81 connects inside the differential control 78 to a velocity-to-displacement converter mechanism which typically could be the speedometer type movement designated as 87 so that the speedometer cable 81 and speedometer movement 87 constitute a means for monitoring the rotational speed of the differential input shaft 59. The speedometer movement 87 converts the rotational movement of the speedometer cable into a displacement which is proportional to velocity, the mechanical displacement output being connected to rheostat movable contact 85 by a coupling system 88 so that the contact 85 progressively reduces the series resistance of the rheostat 84 as differential input shaft 59 increases in rotational velocity.

With centrifugal switch pole 83 closed, the progressive reduction in rheostat 84 resistance with increasing differential input shaft speed causes progressive increase in the current to the solenoid 76 so that the brake 73 is progressively applied to thereby cause more torque to be developed in output shaft 61. The system parameters are so chosen that the brake 73 becomes fully engaged to stop rotation of output shaft 72 at a motor speed corresponding to a desired vehicle speed, which typically might be fifteen miles per hour. The pole 83 of the centrifugal switch is also coupled through a linkage 89 to the speedometer movement 87, or optionally to the speedometer cable 81, so that the switch closes at a predetermined engine speed higher than the normal idle speed, a suitable range for present day automobiles being on the order of 550 to 700 r.p.m. The switch pole 83, rheostat 84, 85, solenoid 76, and the interconnecting conductors constitute a means to transfer the output signal from the monitoring means to the braking device.

With the vehicle standing still and the motor running at idle, switch pole 83 is open and no current is delivered to solenoid 76 so that the brake 73 is completely disengaged, thereby permitting output shaft 72 to spin freely so that no torque whatever is delivered to output shaft 61 which is loaded by the weight of the vehicle transmitted thereto from the rear wheels 23' through the rear end and drive shafts 66 and 67. When the accelerator 58 is now depressed, the motor speed and differential input shaft speed 59 increases from the idle speed to the centrifugal switch pull-in speed so that the pole 83 of the centrifugal switch is closed and minimum energizing current is applied to the solenoid 76 through the full resistance value of rheostat 84. The brake 73 begins to be engaged so that some drag is exerted on output shaft 72 and some torque is thereby transmitted through the differential 60 to output shaft 61 and to the vehicle rear wheel drive system. Continued acceleration of the motor 57 progressively increases actuation of the brake system 73 to further slow the output shaft 72 and deliver more torque to the rear wheels. Thus, by controlling the rotational speed of output shaft 72 through the brake system 73, the gearing ratio between differential input shaft 59 and output shaft 61 is continuously changed to constantly increase the delivered torque.

The system is inherently servo controlled to prevent stalling of the motor 57 by too rapid an application of the brake 73. This naturally follows from the fact that should application of the brake 73 to a given degree start to cause reduction in the rotational velocity of differential input shaft 59 by loading the motor 57, there would be an attendant reduction in the rotational velocity of speedometer cable 81 to thereby reduce the current delivered to solenoid 76 resulting in a backing off of the brake 73 to hereby reduce the load on the motor 57 and allow the speed of shaft 59 to be maintained. It would of course be possible to operate the brake system 73 with a non-automatic manual or foot controlled power assisted mechanism with lock and release devices. Moreover, in the automatically operating system illustrated and described in connection with FIGURES 8 and 10, any desired transmission characteristic can be obtained by tailoring the resistance characteristic of the rheostat 84 to change at a particular rate in a linear or desired non-linear manner.

In a complete vehicle utilizing the drive system shown in FIGURE 8, there would additionally of course be the normal automotive rear end driven at its input by drive shaft 67 and having its output coupled to the rear axles to drive the rear wheels 23'. The following table illustrates several combinations of gearing ratios for the various drive chain component elements which would be operative to drive a vehicle having fifteen inch rear tires at nine miles per hour for motor speeds of 3400 and 400 r.p.m.

| $M_s$, r.p.m. | $T_I$ | $T_s$ | $T_o$ | $D_s$ | $R_r$ |
|---|---|---|---|---|---|
| 3,400 | 3:1 | 2 | 1:3 | 6,800 | 6:1 |
| 3,400 | 3:1 | 2 | 1:2 | 4,540 | 4.2:1 |
| 4,000 | 2.7:1 | 2 | 1:1 | 2,960 | 2.7:1 |
| 4,000 | 2.7:1 | 2 | 1:2 | 5,920 | 5.4:1 |
| 4,000 | 3:1 | 2 | 1:2 | 5,340 | 5:1 | where:

$M_s$ = R.p.m. of motor 57 and shaft 59 (at 90 m.p.h. with 15″ tires)
$T_I$ = R.p.m. ratio of shaft 59 to gear 62
$T_s$ = Differential 60 gearing step-up with shaft 72 locked
$T_o$ = R.p.m. ratio of gear 62 to gear 64
$D_s$ = R.p.m. of drive shaft 67
$R_r$ = R.p.m. ratio of shaft 67 to rear wheels through vehicle rear end and $$D_s = M_s T_I T_s T_o$$

What is claimed as new and useful is:

1. A vehicle power transmission apparatus comprising in combination,
    (a) a pair of spaced apart axially alined pinion gears and a pair of spaced apart axially alined side gears conjointly forming a differential gear train unit journalled for rotation as a unit about the rotational axis of said side gears, said pinion gears being journalled for relative counter rotation about their common axis when either side gear is rotated relative to the other side gear,
    (b) means for coupling said differential gear train unit to a power source operative to rotate said unit as aforesaid about the rotational axis of said side gears,
    (c) a plurality of vehicle traction wheels and means coupling all of said wheels to one of said side gears for simultaneous driven rotation therefrom, and
    (d) control means coupled to the other of said side gears selectively actuatable to effect differential rotation between said side gears, and actuating means for said control means, operation of said wheel coupling means being independent of the actuation of said control means and said actuating means,
    whereby the driving power deliverable through said differential gear train unit from said power source to said plurality of vehicle traction wheels is controllable by said control means.

2. The apparatus as defined in claim 1 wherein said control means comprises a braking device operatively coupled to the said other side gear and effective to reduce the rotation of the latter to any desired degree by varying the coupling between the said braking device and other side gear.

3. The apparatus as defined in claim 1 wherein said control means comprises
    (1) a braking device operatively coupled to the said other side gear and effective when engaged to reduce the rotational rate of the latter to any desired degree by varying the coupling between the said braking device and other side gear,
    (2) monitor means having an input and an output, said input being coupled to said means for coupling said differential gear train unit to a power source and being operative to produce at its output an indication proportional to the rate of rotation of said differential unit, and (3) transfer means coupled to the output of said monitor means and to said braking device effective to respectively increase and decrease the engagement between said braking device and other side gear in accordance with increase and decrease in the rate of rotation of said differential unit under the control of the output of said monitor means.

4. The apparatus as defined in claim 1 wherein said control means comprises (1) a braking device operatively coupled to the said other side gear and effective when engaged to reduce the rotational rate of the latter to any desired degree by varying the coupling between the said braking device and other side gear, (2) monitor means having an input and an output, said input being coupled to said means for coupling said differential gear train unit to a power source and being operative to produce at its output an indication proportional to the rate of rotation of said differential unit, and (3) transfer means coupled to the output of said monitor means and to said braking device effective to respectively increase and decrease the engagement between said braking device and other side gear in accordance with increase and decrease in the rate of rotation of said differential unit under the control of the output of said monitor means, said transfer means including, first transfer means operative to maintain said braking device disengaged from said other side gear when said monitor means indicates at its output a rotation rate of said differential unit less than a first predetermined value, and second transfer means operative to engage said braking device with said other side gear to stop rotation of the latter when said monitor means indicates at its output a rotation rate of said differential unit greater than a second predetermined value higher than said first predetermined value.

5. The apparatus as defined in claim 4 wherein said second transfer means includes an electrically energizable solenoid operative to actuate said braking device in accordance with the degree of solenoid energization, and solenoid energization degree control means in electric circuit therewith and responsive to the output of said monitor means, and wherein said first transfer means includes switch means responsive to the output of said monitor means, said switch means also being in electric circuit with said solenoid and operative to disable the latter at differential unit rotation rates less than the aforesaid first predetermined value to thereby maintain disengaged said braking device.

6. An automotive drive system for use in an automotive vehicle for decreasing the axle ratio through an automotive differential gear train from the input drive shaft to one of the normally driven output shaft axles to thereby increase the rotational velocity of the axle without mechanical gear changing, comprising in combination, (a) a power transmission having an input drive shaft coupled through a differential gear train to first and second driven axles, (b) connecting means carried by said first driven axle for drivingly connecting the latter to at least one vehicular drive wheel to thereby rotate the drive wheel synchronously with the first axle, (c) coupling means carried by the said second driven axle for drivingly coupling the latter to at least one vehicular drive wheel to thereby rotate the drive wheel synchronously with the second axle, said coupling means maintaining driving engagement between said second axle and said at least one vehicular drive wheel so long as the rotational velocity of said second axle is not less than the synchronous rotational velocity of said at least one vehicular drive wheel and permitting disconnection of said driving engagement when the second axle rotational velocity is less than the synchronous rotational velocity of the said at least one vehicular drive wheel, and (d) selectively actuable control means operatively coupled to said second axle effective when actuated to reduce the rotational velocity of said second axle to a desired degree with respect to the rotational velocity of said first axle, whereby, driving power is shifted from said second axle to said first axle through said differential gear train when said control means is actuated.

7. An automotive drive system as described in claim 6 wherein said coupling means comprises a one way clutch system including rotary motion transmitting means rotatably carried on said second axle, said rotary motion transmitting means and second axle each carrying clutch elements engageable with the clutch elements of the other said elements when engaged locking said rotary motion transmitting means for rotation with said second axle and when disengaged permitting said rotary motion transmitting means to rotate freely thereon, rotational velocity of said second axle less than the rotational velocity of said first axle effecting automatic disengagement of said clutch elements.

8. An automotive drive system as described in claim 6 wherein said selectively actuatable control means is a brake device effective to stop rotation of said second axle substantially instantaneously.

9. An automotive drive system as described in claim 6 wherein said connecting means and coupling means respectively carried by said first and second axles for respectively connecting and coupling the same each to at least one vehicular drive wheel each comprise a primary drive gear and a drive chain trained thereabout, said drive chains being trained about separate additional drive gears which latter are each drivingly coupled to at least one vehicular drive wheel.

10. An automotive drive system as described in claim 6 wherein said connecting means and coupling means respectively carried by said first and second axles for respectively connecting and coupling the same each to at least one vehicular drive wheel each comprise a primary drive gear and a drive chain trained thereabout, said drive chains being trained about separate additional drive gears which latter are each drivingly coupled to at least one vehicular drive wheel, said additional drive gears being drivingly engaged with a common axle upon which are fixed for rotation therewith all of the vehicular drive wheels.

11. An automotive drive system as described in claim 6 wherein said connecting means and coupling means respectively carried by said first and second axles for respectively connecting and coupling the same each to at least one vehicular drive wheel each comprise a primary drive gear and a drive chain trained thereabout, said drive chains being trained about separate additional drive gears which latter are each drivingly coupled to at least one vehicular drive wheel, said coupling means comprising a one way clutch system including rotary motion transmitting means rotatably carried on said second axle, said rotary motion transmitting means and second axle each carrying clutch elements engageable with the clutch elements of the other said elements when engaged locking said rotary motion transmitting means for rotation with said second axle and when disengaged permitting said rotary motion transmitting means to rotate freely thereon, rotational velocity of said second axle less than the rotational velocity of said first axle effecting automatic disengagement of said clutch elements, said rotary motion transmitting means comprising the said coupling means primary drive gear.

12. An automotive drive system for use in an automotive vehicle for varying the axle ratio through an automotive differential gear train from the input drive shaft to one of the normally driven output shaft axles to thereby control the rotational velocity of the axle without mechanical gear changing, comprising in combination, (a) a power transmission having an input drive shaft coupled through a differential gear train to first and second driven axles, (b) connecting means carried by said first driven axle for drivingly connecting the latter to at least one vehicular drive wheel to thereby rotate the drive wheel synchronously with the first axle, (c) controllable coupling means carried by the said second driven axle for normally drivingly coupling the latter to at least one associated vehicular drive wheel to thereby rotate the drive wheel synchronously with the second axle and for decoupling the said second driven axle from the said at least one associated vehicular drive wheel, and (d) selectively actuatable control means operatively coupled to said coupling means effective when actuated to cause the latter to decouple said second driven axle from its associated vehicular drive wheel and effective to control the rotational velocity of said second axle to a desired degree with respect to the rotational velocity of said first axle, whereby, driving power is controllably shifted between said second axle and said first axle through said differential gear train when said control means is actuated.

References Cited

UNITED STATES PATENTS

| | | | |
|---|---|---|---|
| 1,882,467 | 10/1932 | Wilt | 180—75 |
| 2,417,139 | 3/1947 | Strehlow | 180—75 |
| 2,874,790 | 2/1959 | Hennessey | 180—6.2 |
| 2,984,455 | 5/1961 | Fischer | 74—710.5 X |

A. HARRY LEVY, *Primary Examiner.*

U.S. Cl. X.R.

180—75; 74—710.5, 778